(12) United States Patent
Sax et al.

(10) Patent No.: US 11,721,504 B2
(45) Date of Patent: Aug. 8, 2023

(54) PYROTECHNICAL DISCONNECTION UNIT, SYSTEM FOR ELECTRICALLY CHARGING AN ELECTRIC ENERGY CELL, MOBILE DEVICE AND CHARGING DEVICE

(71) Applicant: RUAG Ammotec GmbH, Fuerth (DE)

(72) Inventors: Oliver Sax, Weiherhof (DE); Ulrich Bley, Fuerth (DE); Andreas Winter, Fuerth (DE)

(73) Assignee: RUAG AMMOTEC GMBH, Fuerth (DE)

( * ) Notice: Subject to any disclaimer, the term of this patent is extended or adjusted under 35 U.S.C. 154(b) by 79 days.

(21) Appl. No.: 16/638,015

(22) PCT Filed: Aug. 13, 2018

(86) PCT No.: PCT/EP2018/071934
§ 371 (c)(1),
(2) Date: Feb. 10, 2020

(87) PCT Pub. No.: WO2019/030415
PCT Pub. Date: Feb. 14, 2019

(65) Prior Publication Data
US 2020/0243290 A1 Jul. 30, 2020

(30) Foreign Application Priority Data

Aug. 11, 2017 (DE) .................... 10 2017 118 416.3
Mar. 29, 2018 (DE) .................... 20 2018 101 783.7

(51) Int. Cl.
*H01H 39/00* (2006.01)
*H02J 7/00* (2006.01)

(52) U.S. Cl.
CPC ......... *H01H 39/006* (2013.01); *H02J 7/0031* (2013.01); *H01H 2039/008* (2013.01)

(58) Field of Classification Search
CPC ................. H01H 39/00; H01H 39/006; H01H 2039/008; H02J 7/0031
See application file for complete search history.

(56) References Cited

U.S. PATENT DOCUMENTS 3,958,206 A    5/1976  Klint
4,354,432 A *  10/1982 Cannavo' ................ C06B 33/00
                                                102/202.7

(Continued)

FOREIGN PATENT DOCUMENTS

CN   105 449 825 A   3/2016
DE   197 30 873 A1   1/1998

(Continued)

OTHER PUBLICATIONS

International Search Report for PCT/EP2018/071934, dated Nov. 7, 2018, and English Translation submitted herewith (7 pgs.).
Office Action for DE 10 2017 118 416.3, dated Mar. 23, 2018.

*Primary Examiner* — Jacob R Crum
(74) *Attorney, Agent, or Firm* — Fitch, Even, Tabin & Flannery, LLP

(57) ABSTRACT

The pyrotechnical disconnection unit for impairing, preferably interrupting, an electrical charge coupling between a chargeable electrical energy cell, particularly comprising an electrical energy storage and an energy converter, and an electrical energy supply, such as a charging device, provides an electrically conductive connection section, such as an electrically conductive cable, an electrically conductive path or such, via which electrical charging energy is supplied from the energy supply of the electrical energy cell, a housing, in which the connection section is arranged, and a pyrotechnical means accommodated inside the housing being designed and/or being controllable in such a way that it unfolds its pyrotechnical effect when reaching a predefined operational state, wherein the pyrotechnical means (Continued)

Figure 1:
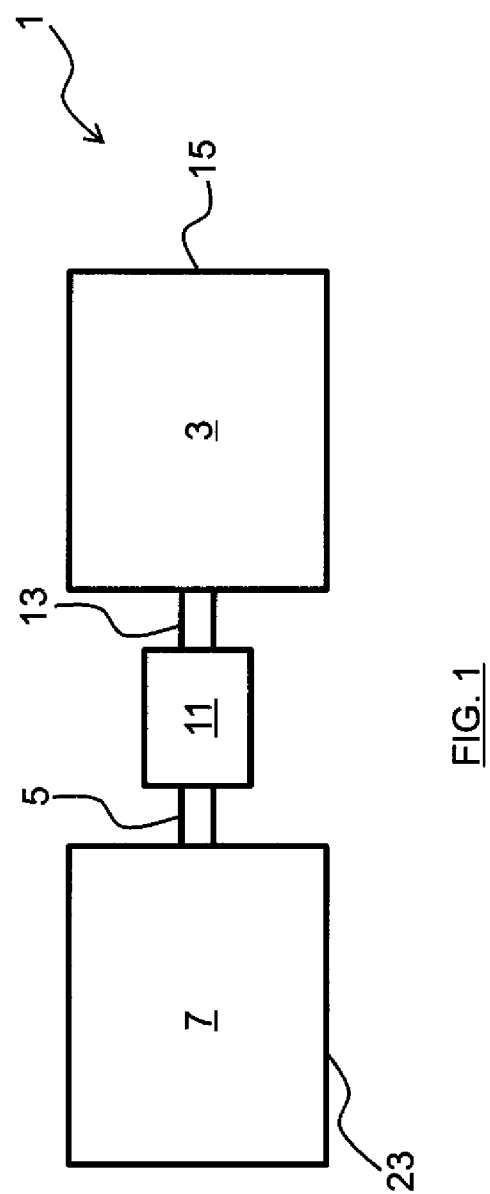

is attributed to the connection section in such a way that the pyrotechnical effect of the pyrotechnical means at least limits, preferably suspends, the electrical conductivity of the connection section inside the housing.

24 Claims, 7 Drawing Sheets

(56) References Cited

U.S. PATENT DOCUMENTS

| | | | |
|---|---|---|---|
| 2004/0041682 A1* | 3/2004 | Pasha | H01H 39/006 337/401 |
| 2004/0113745 A1* | 6/2004 | Lell | H01H 39/006 337/157 |
| 2008/0043385 A1* | 2/2008 | Hagel | C06B 25/34 361/25 |
| 2008/0197001 A1 | 8/2008 | Schlms et al. | |
| 2009/0108812 A1* | 4/2009 | Lee | H01M 50/572 320/150 |
| 2009/0133787 A1 | 5/2009 | Bley et al. | |
| 2010/0066308 A1* | 3/2010 | Chiu | H02J 7/00309 320/136 |
| 2010/0328014 A1 | 12/2010 | Suzuki et al. | |
| 2013/0056344 A1* | 3/2013 | Borg | H01H 39/00 200/81 R |
| 2013/0154352 A1* | 6/2013 | Tokarz | B60L 3/0046 307/9.1 |
| 2013/0175144 A1* | 7/2013 | Sprenger | H01H 39/006 200/61.08 |
| 2016/0225558 A1* | 8/2016 | Chatroux | H01H 39/004 |
| 2016/0356587 A1* | 12/2016 | Perichon | H01H 39/006 |
| 2017/0213676 A1* | 7/2017 | Lell | H01H 39/006 |
| 2018/0127328 A1 | 5/2018 | Hoschenko et al. | |

FOREIGN PATENT DOCUMENTS

| | | |
|---|---|---|
| DE | 197 49 133 A1 | 5/1999 |
| DE | 297 23 872 U1 | 7/1999 |
| DE | 20 2006 020 172 U1 | 4/2008 |
| DE | 10 2007 061 165 A1 | 7/2009 |
| DE | 10 2015 014428 A1 | 5/2016 |
| EP | 1 890 986 B1 | 1/2013 |
| WO | 87/06777 A1 | 11/1987 |
| WO | 2005/058775 A1 | 6/2005 |
| WO | 2006/128910 A1 | 12/2006 |

* cited by examiner ional Application No. PCT/EP2018/071934, filed Aug. 13, 2018, designating the United States, which claims priority from German Patent Application No. 10 2017 118 416.3, filed Aug. 11, 2017, and which claims priority from German Patent Application No. 20 2018 101 783.7, filed Mar. 29, 2018, which are hereby incorporated herein by reference in their entirety.

PYROTECHNICAL DISCONNECTION UNIT, SYSTEM FOR ELECTRICALLY CHARGING AN ELECTRIC ENERGY CELL, MOBILE DEVICE AND CHARGING DEVICE

CROSS-REFERENCE TO RELATED APPLICATIONS

This application is a U.S. national phase application filed under 35 U.S.C. § 371 of International Application No. PCT/EP2018/071934, filed Aug. 13, 2018, designating the United States, which claims priority from German Patent Application No. 10 2017 118 416.3, filed Aug. 11, 2017, and which claims priority from German Patent Application No. 20 2018 101 783.7, filed Mar. 29, 2018, which are hereby incorporated herein by reference in their entirety.

The invention relates to a pyrotechnical disconnection unit for impairing, preferably interrupting, an electrical charging coupling between a chargeable electric energy source and an electrical energy supply. The invention further relates to a system for electrically charging an energy cell, a mobile device with an electrically chargeable energy cell, and a device housing comprising same, as well as an electrical charging device for charging an electrically chargeable energy cell.

Pyrotechnical means, substances, compositions or mixtures of substances are known and can unfold a predefined pyrotechnical effect after the ignition or lighting. The usage of pyrotechnical means for the disconnection of an electrical contact from a battery is already envisaged. A disconnection element is generally known from EP 1 899 986 B1 that comprises a pyrotechnical means, particularly a pyrotechnical, thermal pre-ignition means in order to be positioned at a battery clip. Battery clips are sleeve-shaped connection pieces for example for vehicle batteries in order to realize an electric connection and a decoupling in a simple way.

It is the objective of the invention to overcome the disadvantages of the prior art, particularly to provide a pyrotechnical disconnection unit, with which it is possible to provide a decoupling function employable for the mass usage with little manufacturing effort, assuring a sufficiently reliable disconnection effect and has a plurality of usage possibilities, particularly to avoid the overcharging of an electrical energy cell, particularly with an electrochemical reservoir, in order to exclude an uncontrolled, particularly chemical chain reaction at the energy cell.

The objective is solved by the attributes of claim 1. According to that, a pyrotechnical disconnection unit is provided to impair, particularly to interrupt, an electrical charging coupling between a chargeable electric energy cell, particularly comprising an electrochemical energy reservoir and an energy converter, and an electrical energy supply, such as a charging unit. The pyrotechnical disconnection unit according to the invention can be used for various charging systems, on which a charging function to an energy cell is exerted free of contact via electrical lines or in other ways. At least one electrically conductive connection section, such as a cable section being present proximal to the energy cell of a charging system is provided being particularly suited for the positioning according to the invention inside the hermetically sealed, pyrotechnical disconnection unit. The pyrotechnical disconnection unit according to the invention comprises an electrically conductive connection section, particularly having a longitudinal extension and/or being formed such as a cable, isolated wire, electrical, printed course on a substrate and/or being electrically connected or at least being connectable to the energy cell to be charged. The electrically conductive connection section should serve to bridge a distance between two sides present at the charging path between the energy cell and the charging device. The electrically conductive connection section is particularly arranged in a housing and connects two connections of the pyrotechnical disconnection unit opposing each other particularly diametrically in order to be connected directly or indirectly with the energy cell on the one hand and the charging device on the other hand. The lengthwise extending connection section of the pyrotechnical disconnection unit can for example be formed as an electrically conductive cable, particularly made of metal and/or as a conductive path printed on a circuit board/substrate. Other conductive connection sections can be provided in order to create at least one electric coupling between two points being distal to another and preferably to bridge the two housing connections. The electrically conductive connection section is designed to transmit charging energy from the energy supply through the housing to the electrical energy cell.

Furthermore, the pyrotechnical disconnection unit comprises the housing being particularly pressure tightly closed or closable, in which the electrically conductive connection section is arranged. Preferably, the housing is formed fluid tight, particularly liquid and/or gas tight, however, if desired, can have a defined, preferably semi-permeable gas permeability preferably towards the inside. The housing should entirely enclose the conductive connection section. It shall be clear that the electrically conductive connection section being arranged in the housing should allow the electrical charging coupling with an energy cell and the charging device (in a deactivated state, regarding the pyrotechnical function). Furthermore, an additional pyrotechnical means is provided in the housing of the pyrotechnical disconnection unit according to the invention. The pyrotechnical means is composed of a pyrotechnical substance or mixture that unfolds the pyrotechnical effect on activation. The choice of the pyrotechnical substance particularly depends on the field of application (of the desired pyrotechnical energy conversion) as well as on the dimensioning of the housing and the electrically conductive connection section being arranged in the housing. The pyrotechnical means of the pyrotechnical disconnection unit according to the invention being positioned inside the housing is designed and/or controllable in such a way that its pyrotechnical effect is unfolded particularly only when arriving at a predefined operational state. Thereby, the operational state can be a specific state of the energy cell and/or of the charging device or of another device being arranged close to the energy cell or the charging device or which comprises the energy cell. In a preferred embodiment, the pyrotechnical means is designed only to effectuate when reaching a predefined operational state what can be adjusted by the choice of the specific material for the pyrotechnical means. Preferably, the definable ignition parameter is the temperature being exposed to the pyrotechnical means. Alternatively, the unfolding can also be attained on the predefined operational state by a supplemented control, on which the ignition parameter can be selected temperature independent, for example by a respective electrical control signal, which in turn can depend on measurement parameter, such as temperature, pressure, humidity, velocity, acceleration. An example for a pyrotechnical means that is activated when reaching a specific thermal operational state is the so-called pyrotechnical pre-ignition means, which will be explained in detail later. Thereby, an operational parameter being dependent on the temperature being present at the pyrotechnical means is essential. According to the invention, the pyrotechnical means in the housing is assigned to the electrically conductive connection section in such a way that the pyrotechnical effect of the pyrotechnical means, that means after its activation, is at least limiting, preferably completely suspending, the electrical conductivity of the connection section inside the housing. Particularly, the pyrotechnical means should be adjusted in such a way that such a high thermal energy is released on its ignition or lighting that the electrically conductive connection section is converted at least partly completely so that the electric coupling by the connection section between the electric input and output of the housing is suspended. Because of the placing of the electrically conductive connection section inside the housing, which should also provide volume for the pyrotechnical means, also isolation free metal cables can be appointed as electrically conductive connection sections. The choice of the electrically conductive connection sections also depends on how the conversion of the material can be achieved and the interplay with the activated pyrotechnical means in order to create the electrical interruption inside the housing.

The pyrotechnical means is particularly attributed to an electric conductive connection section in such a way that the pyrotechnical effect is directed to the electric conductive connection section during the conversion of the pyrotechnical means. In an embodiment of the present invention, the electrically conductive connection section is arranged particularly in a void space of the housing, particularly in an expansion space, in which the pyrotechnical effect of the pyrotechnical means is directed during the conversion. Alternatively, or additionally, the pyrotechnical means is arranged preferably in a sandwich arrangement, particularly between a heat source or a control for the unfolding of the pyrotechnical effect and the electrically conductive connection section and/or a void space of the housing, particularly the expansion space. Preferably, the pyrotechnical effect is essentially directed in one directed. This can for example be achieved in that the void space, in which the pyrotechnical means expands during the conversion, is extending starting from a boundary surface between the pyrotechnical means and the void space essentially in one direction, for example vertical or upwards. The pyrotechnical means can for example occupy at least 50%, 60%, 70%, 80%, 90%, 95% or 100% of the entire surface of an inner surface of the housing, such as the bottom of the housing and/or a side, on which the heat source is attached for unfolding the pyrotechnical effect, in order to achieve a directed unfolding of the pyrotechnical effect.

The necessary outer dimensions of the disconnection unit particularly result from the claims of the electrically conductive sections, such as the conductivity of the sections in the disconnection unit and on the requirements to the gas and pressure tightness of the disconnection unit. Particularly by the directed pyrotechnical effect and/or choice of the pyrotechnical means, particularly depending on the electrically conductive section, small dimensions of the disconnection unit can be realized. The disconnection unit can be executed in miniature shape, particularly for the usage in electrical small devices such as mobile phones, headphones, laptops, etc.

It was shown that with a pyrotechnical disconnection unit according to the invention it is possible to assure an immediate electrical disconnection when reaching an undesired critical charging process with high probability, independent from the technical field of use and/or the type of device. Security gaps can be closed in an easy manner, because an uncompromising evacuation of the energy cell from the charging device is thus realized when reaching the critical operational state. An impairment of other components or the charging device can be avoided with the pyrotechnical separation unit according to the invention. Only one electrical connection gap is bridged by the pyrotechnical disconnection unit, which potentially can be refilled easily either by an intact pyrotechnical disconnection unit or by other connection sections, which replace the converted pyrotechnical disconnection unit.

The pyrotechnical disconnection unit is particularly designed in such a way that the same is interchangeable at an energy cell or at an energy supply or at the electrically conductive connection between the energy supply and the energy cell and/or can be removed from the same, particularly without damaging components outside the pyrotechnical disconnection unit, such as components of the electrical energy supply or the electrical energy cell outside the disconnection unit. Preferably, the disconnection unit is designed heat and/or pressure stable in such a way that also after the conversion of the pyrotechnical means the disconnection unit can be exchanged. In order to assure the exchangeability of the disconnection unit, it can be necessary to avoid the damage of components outside the disconnection unit and/or to limit or to avoid particularly a deformation of the outer contour of the disconnection unit during the conversion of the pyrotechnical means. A deformation of the outer contour of the disconnection unit that is too great could for example lead to a form fit such as connection between the disconnection unit and the component(s) outside the disconnection unit, which would limit particularly the exchangeability of the disconnection unit.

In a preferred embodiment of the invention, the housing of the pyrotechnical disconnection unit comprises at least one electrical energy cell sided and one charging unit sided connection. By the respective external connection, the internal electrically conductive connection section is connectable and/or connected on the one hand to the energy cell and on the other hand with the charging device. Preferably, the respective connection is formed as a plug, which the connection section is connected to and particularly is connectable to an electric lead, and/or as passage in a wall of the housing of the pyrotechnical disconnection unit, through which a particularly one-pieced extension of the electrically conductive connection section can extend. Particularly in an embodiment of the connection as plug, particularly as standardized plug, a hermetic sealing of the housing of the pyrotechnical unit can be achieved. At the passage through the wall for leading through an extension, such as a cable extension, a pressure tightness inside the housing should also be realized in that the passages are sealed gas tightly. In a preferred embodiment of the invention the housing is sealed hermetically in that it is molded particularly in one piece and thereby the two connections of the housing wall, of the electrically conductive connection section and the pyrotechnical means are overmolded. Obviously, the housing can also be formed two-pieced, particularly with a container cover structure, wherein the cover can be closed hermetically sealingly, for example by means of screwing, gluing or a combination of mechanical and gluing tightening means. Also, a welding of housing parts for the formation of a one-pieced housing structure can be provided in order to arrive at a hermetically sealed housing. The housing should inhibit the permeation of humidity. Furthermore, the housing should be designed in such a way that after the conversion the combustion gas cannot escape and therefore cannot damage surrounding components. Furthermore, the combustion gases are often environmentally harmful or harmful to health and very hot. In so far it is advantageous, if the housing is formed pressure tight and gas tight. A gas and pressure tightness of at least 20 bar is of advantage. The housing of the pyrotechnical disconnection unit is particularly to be designed hermetically tight in such a way that an inner pressure of at least 2 bar, 5 bar, 10 bar, 20 bar, 50 bar or 100 bar can be withstood. The tightness embodiment also depends on how strong in cross-section the electrically conductive connection section to be interrupted is and/or how great the inner volume of the housing is.

Preferably, the housing is realized of a stiff material, such as plastics, particularly fiber reinforced plastics, or metal, in order to be sufficiently stiff or firm so that the housing structure is staying essentially intact when converting the pyrotechnical means and only the electrically conductive connection section is also converted preferably entirely.

In a preferred embodiment of the pyrotechnical disconnection unit, the pyrotechnical means comprises a thermal pre-ignition means that converts on transgression of a specifically fixed operational temperature, for example of about 80° C., 100° C., 125° C., 150° C., 160° C., 170° C., 180° C., 190° C. or 200° C. (±5° C.), the pyrotechnical means is exposed to. Particularly, the operational temperature, at which the thermal pre-ignition means is converted on its transgression, can be fixed with a tolerance of ±5° C., preferably with a tolerance of ±2.5° C., particularly preferred with a tolerance of ±1.5° C. The predefined unfolding of the pyrotechnical effect can be initiated for example in such a way that the thermal pre-ignition means is arranged adjacent to a heat source to be monitored, which particularly represents a characteristic feature for the operational state. For example, the heat evolution of the energy cell is a strong indicator whether the charging function is executed in the correct way. An energy cell showing a defect can quickly lead to untypically high temperatures, which can trigger an uncontrollable chain reaction inside the energy cell. In order to avoid this, the thermal pre-ignition means can be adjusted in such a way that the pyrotechnical means can be converted also at low temperatures, which do not trigger chain reactions. By that, the pyrotechnical means itself takes over the monitoring function regarding a predefined critical operational state. The thermal pre-ignition means can be arranged particularly also adjacently to a heat source of the electrical energy supply, for example adjacent to a voltage regulator of a charging device. Besides the temperature dependency, also other operation parameters, such as luminosity or pressure can be put in place in order to achieve a self-ignition of the pyrotechnical means from an ignition threshold. Preferably, the housing of the pyrotechnical disconnection unit has a wall section, preferably a base, on which the pyrotechnical means, such as a pre-ignition means is arranged inner housing sided touching the wall section and is designed to attach the pyrotechnical disconnection unit to a monitoring device. Furthermore, also the wall section can be attached outer sided at the portion of the heat source and/or at an outer side of the cell housing of the energy cell. Preferably, the wall section thickness is formed greater than 1 mm or 2 mm and/or formed of a heat transferring material that can transfer heat from the outside of the housing easily to the pyrotechnical means.

In a further development of the invention, the housing has an overall inner volume that is enclosed by the housing walls. The pyrotechnical means is taking more than 20% or 30% and not more than 60% or 50% of the entire inner volume. Preferably, the volume of the pyrotechnical means is significantly less than 50% of the entire inner volume but greater than 10% or 20% of the entire inner volume. The volume portion being free of the pyrotechnical means can preferably be filled with gas, such as air. By the volume ratio between the coverage of the pyrotechnical means and the free gas space in the housing, the conversion of the pyrotechnical means can be adjusted.

In a preferred embodiment of the invention, the pyrotechnical disconnection unit further comprises a control, particularly an electric control, for starting, particularly igniting or lighting, of the pyrotechnical effect of the pyrotechnical means. Preferably, the control is arranged inside the housing of the pyrotechnical disconnection unit. With the additional control, the conversion of the pyrotechnical means inside the housing can also be achieved independently of the conversion conditions of the pyrotechnical means. By that, a more precise and more reliable start of the conversion of the pyrotechnical means is achievable. Parts of the control can be in contact with the pyrotechnical means and are particularly embedded in the pyrotechnical means. Preferably, the control is formed by a heating element, such as an electrical resistance. In case the control is activated for example by a computer or a user by supplying an electric control signal to the heating element, the heating element is activated and evolves heat, which for example effectuates the start of the pyrotechnical conversion when using the thermal pre-ignition means. Particularly, the control can be used for the state monitoring and/or be part of a state monitoring. By means of a state monitoring, it can be checked whether the pyrotechnical means has been converted. The control, preferably a heating element the control lead and/or the pyrotechnical means can for example be designed in such a way that the pyrotechnical effect of the pyrotechnical means destroys, harms the control and/or the control lead or limits, preferably suspends the connection between the control and the control lead. Particularly, the pyrotechnical means can be adjusted regarding the heat resistibility of the control and/or the control lead for that, or vice versa. The state monitoring can, preferably for a control in the shape of an electric heat resistance, take place particularly by a control current and/or a control voltage. Particularly, the control current can be interrupted by the conversion of the pyrotechnical means, for example when the connection between the control lead and the control is interrupted or an increase of resistance, for example at the heating element, is measured. Also, other controls can be used, for example a pyrotechnical control can be used, which can for example have a detonating cap which is sufficient to induce a complete conversion of the pyrotechnical means inside the housing. The detonation or ignition cap is preferably arranged adjacent to the pyrotechnical means inside the housing and can be activated by an ignition lace leading outside. Other control units are employable that are sufficient to supply a sufficient activation energy to the pyrotechnical means and to induce the conversion of the pyrotechnical means inside the housing.

By using a control that can be activated from outside the disconnection unit, the disconnection unit is suitable for a remote-controlled conversion, particularly for a remote-controlled emergency shutdown. The activation can take place particularly wireless, for example via radio communication or via a cable being guided outwards of the disconnection unit.

In a further development of the invention, the control has a control lead, which can extend through the control connector at the housing and be coupled with a control. The control connection can be formed as a plug via which particularly the electric lead is connectable or as passage in a wall of the housing through which the control lead extends itself.

Preferably, the control lead can be connected to a control device that can be part of a mobile device that is to be explained later, which can supply an activation signal to the control for converting the pyrotechnical means.

The following materials, substances and mixtures can be put in place to a preferred pyrotechnical means, wherein it is clear that the separate substances can also be used in combination with each other according to the invention.

Particularly, according to the invention azotetrazolates are employed as components. Particularly, aminoguanidine-5,5'-azotetrazolate ($C_4H_{14}N_{18}$), in short AGATZ, and guanidine-5,5'-azotetrazolate ($C_4H_{12}N_{16}$), in short GATZ, are employed as azotetrazolate component.

The azotetrazolate components can be employed singular or as a mixture among each other and/or with further components. The structural formula of AGATZ and GATZ are as follows:

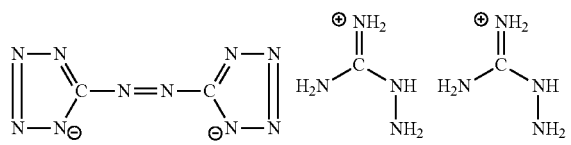 [SMILES: N(=Nc1nnn[n-]1)c1nnn[n-]1 ; NNC(N)=[NH2+] ; NNC(N)=[NH2+]]

Aminoguanidine-5,5'-azotetrazolate ($C_4H_{14}N_{18}$, AGATZ).

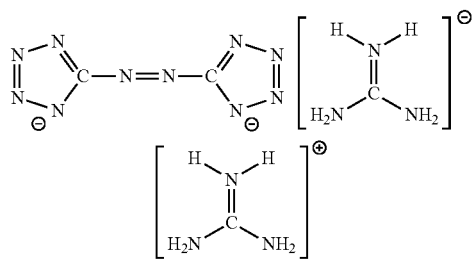

Guanidine-5,5'-azotetrazolate ($C_4H_{12}N_{16}$, GATZ).

The trigger or deflagration point of pure AGATZ is 209° C., same of GATZ is 240° C.

By mixtures of AGATZ and/or GATZ and/or selected components, the deflagration temperatures can be controlled in the range from 165° C. to 195° C., and deflagration temperatures of the mixtures can lie lower than those of the single components.

For pre-ignition means, deflagration temperatures below 200° C. are particularly interesting. The pyrotechnical means according to the invention fulfill this demand at extraordinary long-time stability.

As additives for pyrotechnical means additives can be used:

1. Oxidation Means (Singular or in Mixtures)

Nitrates of the alkali metals and/or alkaline earth metals and/or of the ammonium, such as sodium, potassium or ammonium nitrate, perchlorates of the alkali metals and/or alkaline earth metals and/or of the ammonium, peroxides of the alkali metals and/or alkaline earth metals or of zinc.

2. Nitrogen Containing Compounds (Singular or in Mixtures)

Ammonium picrate, amino guanidinium picrate, guanidinium picrate, amino guanidinium styphnate, guanidinium styphnate, nitroguanidine, nitroamino guanidine, nitrotriazolone, derivates of the tetrazoles such as 5-aminotetrazol, ditetrazolylamine, ditetrazole and/or its salts, nitraminotetrazole and/or its salts, such as ammonium-nitratem, diamino guanidine nitrate, triamino guanidine nitrate, guanidine nitrate, dicyandiamidine nitrate, diamino guanidine-azotetrazolate, triamino guanidine-azotetrazolate and/or ammonium-azotetrazolate.

3. Energy-Rich Aggregates (Singular or in Mixtures)

Hexogen, octogen, nitro cellulose

4. Reduction Means (Singular or in Mixtures)

Aluminum, titanium, titanium hydride, boron, boron hydride, zirconium, zirconium hydride, silicium, graphite, active carbon, carbon black.

5. Binders (Singular or in Mixtures)

Cellulose and its derivates, polyvinyl butyrale, polynitropolyphenyl, polynitrophenyl ether, plexium, polyvinyl acetate, copolymers.

6. Burn-Off Moderators, Stabilizers and Processing Aids (Singular or in Mixtures)

Ferrocene and derivates, acetonyl acetates, salicylates, barium carbonate, strontium carbonate, magnesium carbonate, melamine, zinc oxide, zinc carbonate, silicates, silica gels, silicic acid, for example Aerosil (Company Degussa), boron nitride.

Thereby, dinitrobenzofuroxane (DNBF) is used as component. The Dinitrobenzofuroxane can be used in mixtures or with further components. The melting point or the decomposition point, respectively, of pure dinitrobenzofuroxane (DNBF) is about 170° C.

In mixtures of DNBF with select components, the deflagration temperatures can be controlled in the range between 150° C. to 160° C. and the deflagration temperatures of mixtures can be lower than those of the singular components.

The above-mentioned additives can be used.

Furthermore, the pyrotechnical means can be formed by the usage of 2-[bis-(2,4,6-trinitrophenyl)]aminoethyl nitrate, in short denoted as dipicryl aminoethyl nitrate (DPN). This substance can be used either alone or in mixtures with further components. DPN can be produced from 2,4-dinitrochlorobenzol and ethanol amine with subsequent nitration (literature: R. V. Clark, Ind. Eng. Chem., 25, 1385 (1933)). The structural formula is as follows:

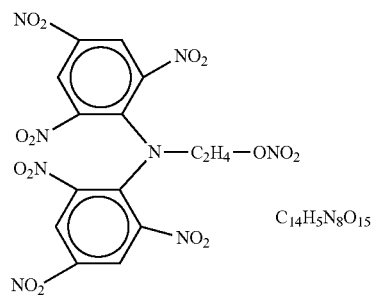

The deflagration point of pure DPN is about 200° C. With mixtures of DPN with selected components as additives the deflagration point can be controlled in the range between 178° C. to 208° C. and the deflagration temperatures of the mixtures can be lower than those of the singular components.

The following additives can be used.

1. Nitrogen-Containing Compounds (Singular or in Mixtures)

Nitro guanidine, nitro amino guanidine, nitro triazolone, derivates of tetrazole such as 5-amino tetrazole, ditetrazolyl amine, ditetrazole and/or its salts, nitramino tetrazole and/or its salts, such as ammonium-nitramino tetrazole and/or amino guanidinium-nitramino tetrazole, amino guanidine nitrate, diamino guanidine nitrate, triamino guanidine nitrate, guanidine nitrate, dicyan diamidine nitrate, diamino guanidine-azotetrazolate.

2. Oxidation Means (Singular or in Mixtures)

Nitrates of the alkali metals or alkaline earth metals or of the ammonium, such as sodium nitrate or potassium nitrite, perchlorates of the alkali metals or alkaline earth metals or of the ammonium, peroxides of the alkaline earth metals or of zinc.

3. Reduction Means (Singular or in Mixtures)

Aluminum, titanium, titanium hydride, boron, boron hydride, zirconium, zirconium hydride, silicium, graphite, active carbon, black carbon.

4. Binders (Singular or in Mixtures)

Cellulose and its derivates, polyvinyl butyrale, polynitro polyphenylene, polynitro phenyl ether, plexium, polyvinyl acetate, and copolymers.

5. Energy-Rich Additives (Singular or in Mixtures)

Hexogen, octogen and nitro cellulose

6. Burn-Off Moderators and Processing Aids (Singular or in Mixtures)

Ferrocene and derivates, acetonyl acetate, salicylate, silicates, silica gels, boron nitride. Furthermore, primary explosive substances can be used singularly, in combination with above-mentioned substances or as mixtures among each other for achieving a higher effectiveness. Diazonitrophenole, salts of the styphine acid, tetrazane, salts of the dinitrobenzofuroxanes are named as examples.

Furthermore, the invention relates to a system for electrically charging an electrical energy cell, which can particularly have an electric energy storage and an energy converter. The system comprises a pyrotechnical disconnection unit according to the invention, an electric energy cell and/or an electric charging device. The energy cell can be charged by the charging device via an electric connection/lead, wherein the pyrotechnical disconnection unit is integrated in the electrical connection/lead, so that the electrical connection/lead between the energy cell and the charging device is interrupted on activation of the pyrotechnical disconnection unit. Thereby, the pyrotechnical disconnection unit can be located with an own housing outside the device housing of the charging device and the energy cell, particularly outside the housing of the mobile device. In a preferred embodiment of the invention the pyrotechnical disconnection unit according to the invention is arranged in the area of the plug connection of the electric connection lead between the energy cell and the charging device. This area is of advantage, since it has a stiffer structure than the flexible connection cable between the connection plugs. It shall be clear that invention accordingly the pyrotechnical disconnection unit can also be arranged inside the charging device or the mobile device for extending a fresh connection section into the housing of the pyrotechnical disconnection unit.

Furthermore, the invention relates to a mobile device, such as a radio device, a laptop, an electric cigarette, a smartphone, a flashlamp, a headphone or such. The mobile device comprises an electric chargeable energy cell, such as a battery or an accumulator. The mobile device further has a device housing in which the energy cell is accommodated entirely. The device housing serves as protection against hits and entering of humidity. The energy cell is completely accommodated inside the device housing. The device housing furthermore has at least one charging connection on which the external electric charging device is connectable. Inside the device housing of the mobile device and preferably adjacent to the energy cell of the mobile device, a pyrotechnical disconnection unit is arranged in such a way that the pyrotechnical effect between the charging connection and the energy cell is interrupted when reaching the predefined operational state. It shall be clear that the pyrotechnical disconnection unit can be designed according to the above-mentioned disconnection unit according to the invention. The pyrotechnical disconnection unit is located outside the housing of the energy cell, but, as previously described, inside the device housing and interrupts the electric connection between the connection and the energy cell. Both, the housing of the pyrotechnical disconnection unit and the mobile device housing serves as protection for the user when the pyrotechnical means is converted inside the pyrotechnical disconnection unit.

The invention further relates to a charging device for charging the electric chargeable energy cell, such as a battery or an accumulator, particularly of an invention accordingly mobile device described above. The charging device comprises a device housing having a charging connection on which the energy cell is connectable. Inside the device housing of the charging device, a pyrotechnical disconnection unit is arranged, which interrupts an electric connection inside the device housing between the connection and the energy cell by its pyrotechnical effect when reaching a predefined operational state. It shall be clear that also with a contactless energy charging, for example by electric magnetic, inductive charging processes, a critical operational state can then be excluded, if the pyrotechnical disconnection unit is disconnecting an energy supply to the inductivity in the area of the loading station, or the pyrotechnical disconnection unit is arranged in the area of the mobile device so that the radio receiver, which converts the radiation into electrical energy, is disconnected from the energy cell to be charged.

Moreover, the present invention relates to a pyrotechnical disconnection unit for impairing, preferably interrupting, an electrical coupling at the electric energy supply, such as a charging device, an electrochemical energy storage and/or an energy converter. The pyrotechnical disconnection unit comprises an electrically conductive connection section, such as an electrically conductive cable, an electric conductive path or such, via which the electric energy can be conducted from the energy supply. Particularly, electrical energy is conductible from the electric energy supply or conductible to the energy supply via the connection section. The pyrotechnical disconnection unit further comprises a housing, in which the connection section is arranged, via the connection section. The pyrotechnical disconnection unit further comprises a housing, in which the connection section is arranged, and a pyrotechnical means accommodated inside the housing designed and/or controllable in such a way that the pyrotechnical effect unfolds when reaching a predefined operational state. The pyrotechnical means can furthermore be attributed to the connection section in such a way that the pyrotechnical effect of the pyrotechnical means is at least limiting, preferably suspending, the electrical conductivity of the connecting section inside the housing.

The energy supply can for example be an electric energy cell. The energy cell can for example be a lithium battery. Preferably, so-called secondary batteries shall be provided which are also denoted as accumulators, which are rechargeable after discharging. Lithium ion accumulators are used for example. So-called batteries are used as accumulators or battery types which primarily find application for example in wrist watches, smartphones, laptops or flashlights, primarily.

The disconnection unit can be embodied in miniature, particularly for the use in electric small devices, such as smartphones, headphones, laptops or such. The housing receiving the pyrotechnical means as well as the amount of pyrotechnical material for interrupting or impairing the electric coupling should be particularly small in such a way that the pyrotechnical unit including the housing is receivable space-savingly in the housings of electronic small devices, preferably in such a way that the overall dimensions of the electronic small devices are not enlarged by the presence of the pyrotechnical disconnection unit. A lithium ion accumulator for example, which is used in smartphones, can for example have an overall dimension of about 4 cm×3 cm×0.5 cm (length×width×height). In this case, the housing of the pyrotechnical disconnection unit can be dimensioned as large as 0.5×0.5×0.5 cm, or have an adequate cylindric dimension. In particular, the disconnection unit or the housing, respectively, is miniaturized in such a way and the necessary amount of pyrotechnical material is as small as to allow the placement in electronic small devices. It shall be clear that the fill level of the pyrotechnical material inside the housing does not need to completely fill the housing. Particularly, a certain amount of oxygen volume can be present inside the housing for the pyrotechnical conversion of the pyrotechnical material.

Such materials qualify for the housing of the pyrotechnical disconnection unit, which on the one hand comply with the requirements to a pressure-tight closed or closable, particularly fluid, liquid and/or gas-tightly closable housing and on the other hand can allow for a heat input to be provided by the critical heat source towards the pyrotechnical material. For example, metal, such as steel, brass, aluminum, plastics or glass fiber materials can be used. The wall thickness and the choice of material are adjusted to each other in such a way that the requirements on tightness of the housing as well as the possibility for heat transfer are facilitated. It was found out that on the one hand the positioning of the housing igniting the pyrotechnical material time-sensitively, as well as the heat conduction gradient of the components surrounding the pyrotechnical material is relevant in order to realize the conversion or ignition, respectively, of the pyrotechnical material at a desired time, particularly to avoid a delayed ignition or a premature ignition.

In an exemplary embodiment of the pyrotechnical disconnection unit according to the invention, the housing has at least two connections, particularly plug connections, via which the connection section is connectable or connected to the electric component, such as an electric load. Preferably, the respective connection is formed as plug, which is connected and/or connectable or connected via the particularly one external electric lead, or as a passage in the wall of the housing, through which a particularly one-pieced extension of the electrically conductive connection section is extending.

According to a further development of the present invention, the pyrotechnical means comprises a thermal pre-ignition means that converts when exceeding an operational temperature, for example of 100° C., 125° C., 150° C., 160° C., 170° C., 180° C., 190° C. or 200° C., which is exposed to the pyrotechnical means. The predefined unfolding of the pyrotechnical effect can be achieved for example in that the pyrotechnical means is arranged adjacent to a heat source, which is a characteristic for a critical operational state, wherein particularly the housing comprises a wall section, preferably a base on which on the inside of the housing the pyrotechnical means is arranged touchingly and/or is arranged on the outside in the portion of the heat source and/or at an outer side of the cell housing of an electrical component.

In an exemplary embodiment of the pyrotechnical disconnection unit according to the invention, the housing comprises an overall volume of which the pyrotechnical means occupies not more than 60%, preferably less than 50%, but more than 10% or 20%, wherein particularly the volume portion being free of the pyrotechnical means is filled with gas, such as air.

According to a further development of the present invention, the pyrotechnical disconnection unit comprises a control for starting the pyrotechnical effect of the pyrotechnical means, wherein the control is provided inside the housing. The control can be in contact with the pyrotechnical means. For example, the control can be embedded in the pyrotechnical means. In an exemplary further development, the control is formed by a heating element, such as an electrical heating resistance. The control can hereby have a control lead which extends through a control connect from outside the housing into the housing and that is coupled with a control. The control connection can for example be formed as plug that is connected to the internal control lead and/or is connectable via the particularly one external electric lead or as passage in a wall of the housing, through which the control lead is extending.

Furthermore, the present invention relates to a system for the electric charging of an electric energy cell. The system comprises a pyrotechnical disconnection unit, which can be formed for example according to the aspects according to the invention described above. The system further comprises an electrical energy supply cell which can transmit electrical energy via an electric connection. The electric energy supply can for example dissipate the electrical energy via the electrical connection or energy can be supplied via the electrical connection. The pyrotechnical disconnection unit is arranged in the electrical connection for example in such a way that the electrical connection between the energy cell and the charging device is interrupted on ignition of the pyrotechnical disconnection unit.

Furthermore, the present invention relates to an electronic device, particularly electronic small device, such as mobile phone, laptop, electric cigarette, smartphone, headphones or such, with an electrical chargeable energy cell, such as a battery or an accumulator. The electronic device comprises a device housing in which the energy cell is accommodated completely and which has a connection, on which the electrical charging device or an electrical load is connectable to or is connected. Inside the device housing of the electrical device, for example, a pyrotechnical disconnection unit is arranged which for example can be formed according to the aspects according to the invention described above. Preferably, the pyrotechnical disconnection unit is arranged in such a way that the pyrotechnical effect interrupts an electrical connection between the connection and the energy cell when reaching a predefined operational state.

Furthermore, the present invention relates to an electronic device, particularly electronic small device, such as mobile phone, laptop, electronic cigarette, smartphone, headphones or such, with which the electrical chargeable energy cell, such as a battery or an accumulator. The electronic device comprises a device housing, in which the energy cell is accommodated entirely and which has a connection, on which an electrical device is connectable or is connected. Preferably, the pyrotechnical disconnection unit is arranged in such a way that its pyrotechnical effect interrupts an electrical connection between the connection and the energy cell when reaching a predefined operational state.

Furthermore, the present invention relates to a system for electrically discharging an electrical energy cell. The system comprises a pyrotechnical disconnection unit which, for example, can be formed according to the aspects according to the invention described above. Furthermore, the system has an electrical energy cell and an electrical load. The energy cell can be loaded by the load via an electrical connection. Furthermore, the pyrotechnical disconnection unit is integrated into the electrical connection. Preferably, the disconnection unit is integrated in such a way that the electrical connection between the energy cell and the load is impaired, preferably interrupted, on ignition of the pyrotechnical disconnection unit.

Regarding the materials, substances, additives and mixtures to be used for the pyrotechnical means, it is referred to the embodiments relating to the previous aspects according to the invention.

Preferred embodiments are given in the subclaims.

Figure 2:
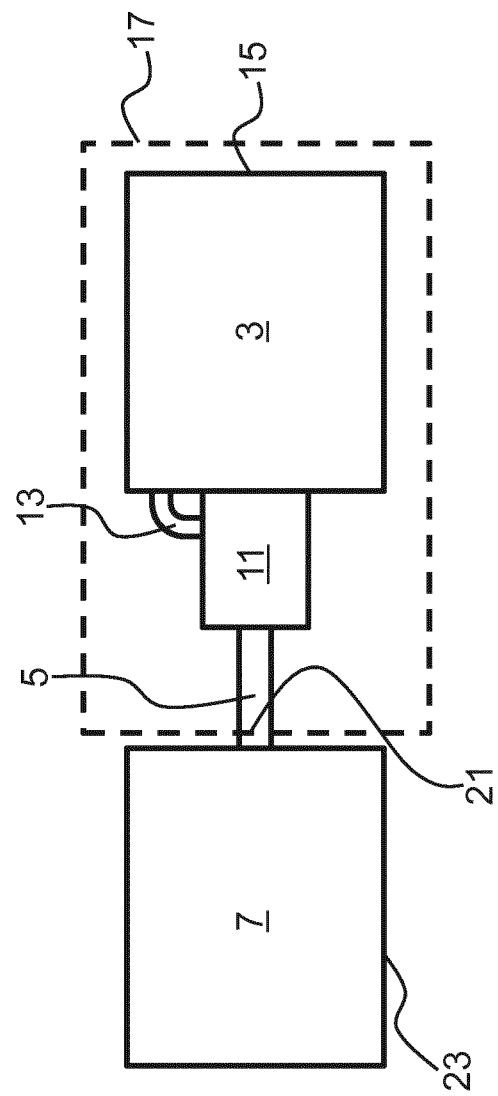
Figure 3:
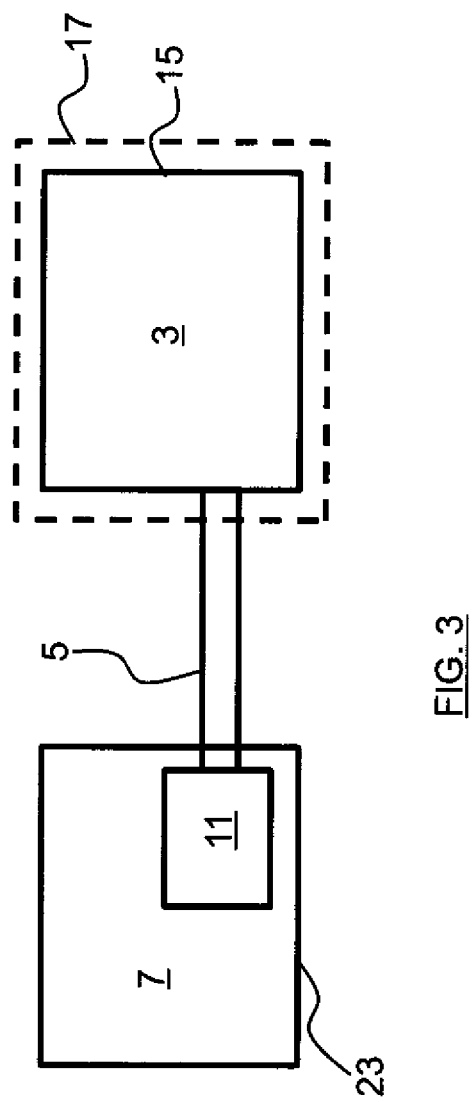
Figure 4:
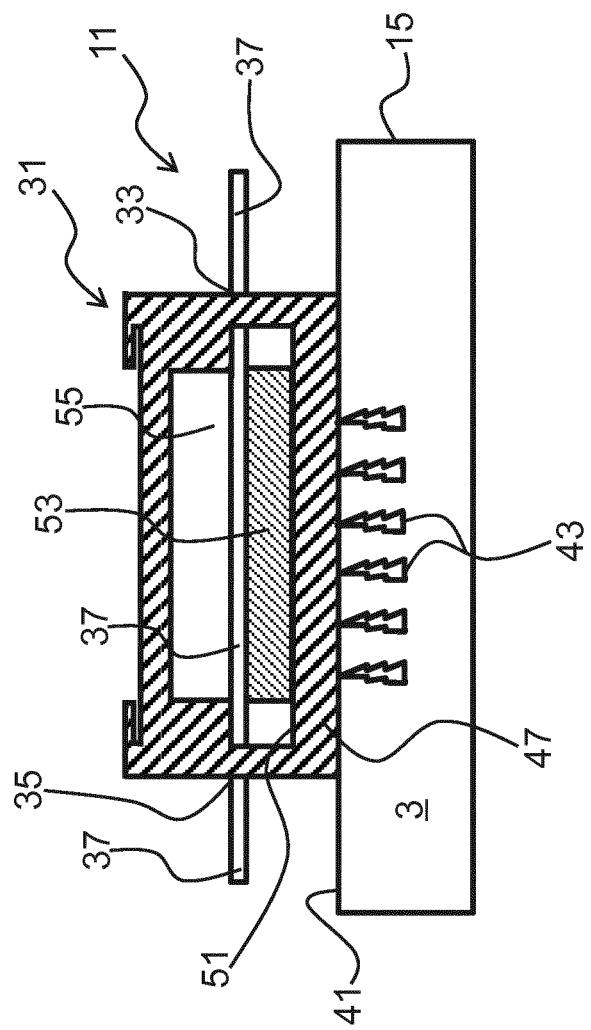
Figure 5:
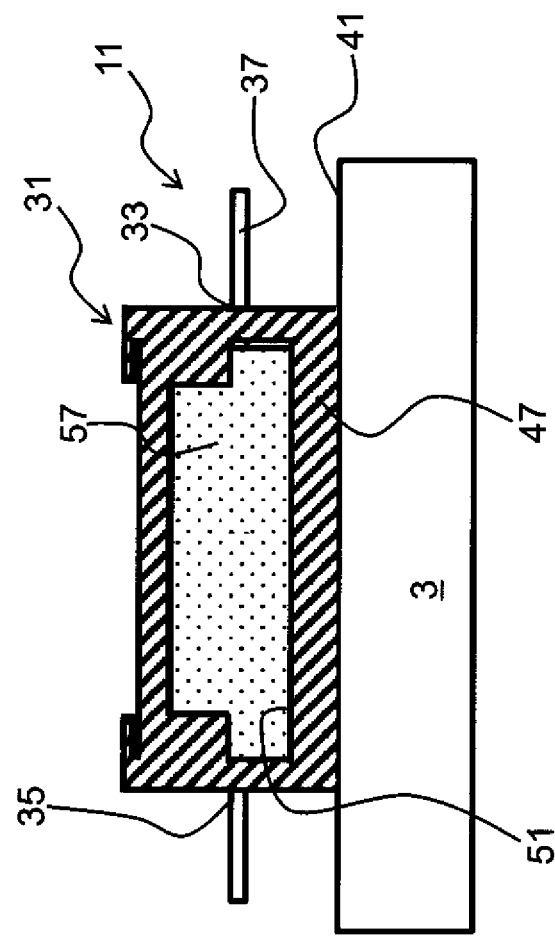
Figure 6:
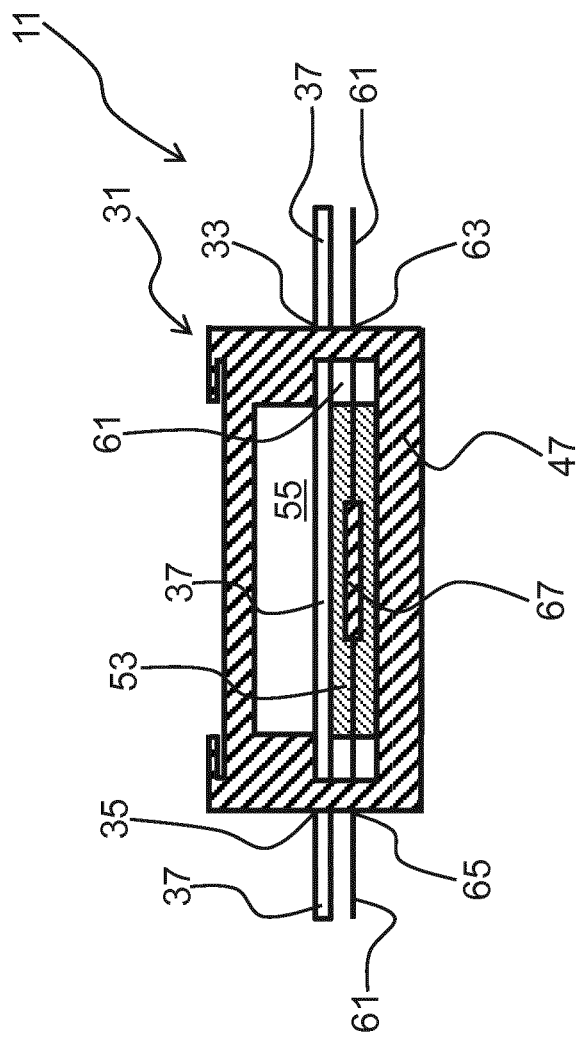
Figure 7:
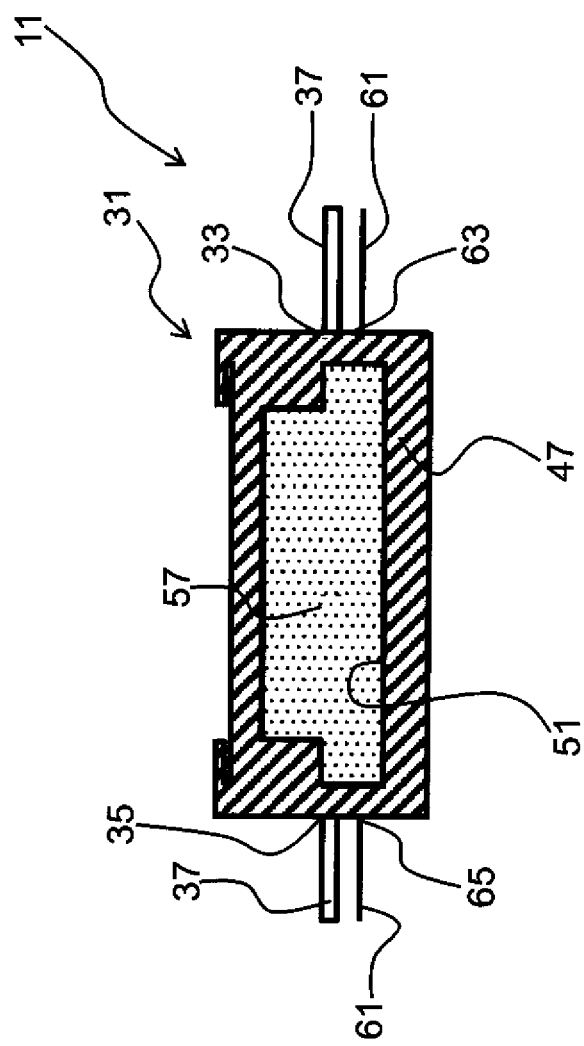

Further properties, advantages and features of the invention are explained by the following description of preferred embodiments of the invention by means of the Figures enclosed, which show:

FIG. 1 a schematic depiction of a charging system according to the invention for a rechargeable electrical energy cell, such as a battery, in a first embodiment;

FIG. 2 a schematic principle sketch of a charging system according to the invention for an electrical energy cell, such as a rechargeable battery, in a second embodiment;

FIG. 3 a schematic principle sketch of a charging system according to the invention for an electrical energy cell, such as a rechargeable battery, in a third embodiment;

FIG. 4 a schematic cross-sectional view of a pyrotechnical disconnection unit according to the invention in a first embodiment, wherein the pyrotechnical disconnection unit is in an inactivated hold state;

FIG. 5 a schematic cross-sectional view of the pyrotechnical disconnection unit according to FIG. 4 after its conversion;

FIG. 6 a schematic cross-sectional view of a pyrotechnical disconnection unit according to the invention of a pyrotechnical disconnection unit in a second view, wherein the pyrotechnical disconnection unit is in an inactivated hold state;

FIG. 7 a schematic cross-sectional view of the pyrotechnical disconnection unit according to the invention according to FIG. 6 after its conversion.

In FIG. 1 the system for electrically charging of an electrical energy cell according to the invention is generally attributed to the reference numeral 1. The electrical energy cell of the depiction in FIG. 1 is a rechargeable or multiple chargeable battery 3, which comprises an electrochemical energy storage and energy converter not further depicted. The rechargeable battery 3 is coupled to an energy cell charging device via an electrical connection for example in the shape of an electrical cable lead (5, on the same side of the charging device 7; 13 on the same side of the energy source), the energy cell charging device being shown in the embodiment of a battery charging device 7 in FIG. 1.

In order to avoid a critical overload state of the electrical energy cell, the pyrotechnical disconnection unit 11 according to the invention is arranged in the area of the lead 5. In an embodiment of the invention, the lead 5, 13 extends through the housing of the pyrotechnical unit 11. In a certain operational state, which can be measured or be determined for example by sensing (by sensors) of a certain temperature in or at the energy cell and/or in or at the battery charging device, the pyrotechnical disconnection unit 11 is activated in order to be able to unfold its pyrotechnical effect and to effect on the lead 5, 13 in such a way that the pyrotechnical disconnection unit 11 at least impairs, preferably completely interrupts, the electrical ability for energy transfer of the lead 5, 13 by the pyrotechnical effect. Thereby, a further energy supply to the battery 3 is interrupted and an overcritical state is inhibited.

In the embodiment shown in FIG. 1, the electrical lead 5, 13 is formed for example by a cable or by a conductive path printed on a substrate, the lead being interrupted intentionally by the pyrotechnical means in that it is converted thermally by the unfolding of the pyrotechnical effect of the pyrotechnical means and providing no electrical conductivity of the electrical lead 5 any more so that the energy cell 3 is disconnected electrically and charge-technically from the charging device 7.

In the system according to the invention depicted in FIG. 2, the same reference numerals are used for the same or similar components being already put in place in FIG. 1.

The electrical charging device 7 is connected via the lead 5 for example in the shape of a charging cable pyrotechnical disconnection unit 11 according to the invention which is directly attached to an outer connection of the battery 3 to be charged so that the temperatures being present at the outer side of the battery can be transferred because of the direct touching contact of the pyrotechnical disconnection unit. The lead 13 branches from the pyrotechnical disconnection unit 11 in order to supply electrical energy to the charging device 7 to the battery 3 in an unimpaired pyrotechnical disconnection unit 11. The same as in the embodiment according to FIG. 1, the pyrotechnical means of the pyrotechnical disconnection unit is converted when reaching the predefined operational state, for example when reaching a maximal allowable outer temperature at the outer side of the housing 15 of the battery 3, which is particularly measured by a sensor, which is either arranged inside the battery 3, at the outer side of the battery 15 or inside the pyrotechnical disconnection unit 11, or, which starts a self-ignition of the pyrotechnical means material-immanently.

Another peculiarity of the embodiment of the charging system for an electrical energy source according to FIG. 2 is provided in that the pyrotechnical disconnection unit 11 according to the invention and the energy cell is accommodated in a joint housing 17 being dashed, so that the loading system according to the invention is able to be set up as a unit with a joint housing. The housing 17 has a connection 21, on which the charging device 7 can be connected to be either directly by means of a respectively formed plug forming an electrical charging coupling with the lead 5 or that can be connected electronically via a connection lead (not further depicted) being couplable to a charging device 7. It shall be clear that the critical operational state can be identified in that a critical temperature can be captured in the area of the charging device 7. Preferably, the joint housing 17 is a housing of a mobile device, such as a mobile phone.

The critical operational state does not necessarily have to be identified by the temperature, particularly by reaching a maximal temperature, but rather other measurable operation parameters can be used in order to capture a critical operational state of the charging device 7 and/or the battery 3.

A further embodiment of the system 1 for electrically charging of an electrical energy cell according to the invention is shown in FIG. 3, wherein the system 1 according to the invention merely provides an arrangement of the pyrotechnical disconnection unit 11 inside the housing 23 of the charging device 7. This embodiment is particularly of advantage when a destruction of the electrical energy cell 3 and/or its environment and/or the lead 5, 13 should be prevented.

As apparent from FIG. 3, the mobile device housing 17 does not contain the pyrotechnical disconnection unit 11 anymore. Also, contrary to the embodiment according to FIG. 1, the pyrotechnical disconnection unit 11 is not arranged between the charging device 7 and the battery 3 anymore, that means not outside of both housings 23, 17 in the area of the charging connection 5, but inside the housing 23 of the charging device 7.

The pyrotechnical disconnection unit 11 is arranged inside the charging device 7 in such a way that the functional ability of the charging device 7 is impaired or completely suspended after the unfolding of the pyrotechnical effect of the pyrotechnical means 53 of the disconnection unit 11.

The ignition of the pyrotechnical disconnection unit 11 according to the embodiment of the system according to FIG. 3 can also be temperature-dependent or be triggered depending on a charging current 5 inside the charging device 7 at the energy cell 3 being sensed critically.

It shall be clear that the pyrotechnical disconnection unit 11 according to the invention does not have to be ignited necessarily by operational states of one component being located inside one of the components of the systems described above, that means charging device 7, lead 5, 13 or battery 3. It shall be clear that also an external control unit (not depicted) can be designed to start the ignition of the pyrotechnical means of the disconnection unit 11. For example, the pyrotechnical disconnection unit can also be provided with a signal receiver that starts the ignition of the pyrotechnical disconnection unit 11 independently from capturing a specific operation parameter of one of the components of the system 1 according to the invention when receiving a respective control signal. An especially simple control unit (not depicted) can be achieved in that a detonating cap being electrically controllable is arranged close to the pyrotechnical means of the pyrotechnical disconnection unit 11. When receiving a predefined electrical ignition signal, the ignition or detonation cap is converting and starts the pyrotechnical unfolding of the pyrotechnical means of the disconnection unit 11.

For all of the three systems 1 according to the invention mentioned above, a mobile phone can be taken as electrical device to be charged by the system that particularly provides the pyrotechnical disconnection unit 11 in the area of the rechargeable battery. It shall be clear that the pyrotechnical unit 11 can also be accommodated in the charging cable, for example at the charging device-sided plug, such as the USB plug, or the telephone-sided plug. The critical operational state can thereby be captured by both the charging device 7 and the mobile device, which starts the ignition of the pyrotechnical means 53 inside the pyrotechnical disconnection unit 11 when reaching the critical operational temperature.

Particularly in the arrangement of the pyrotechnical disconnection unit 11 inside the charging cable or in the area of the charging device 7, a destruction of the environment of sensitive components of the mobile phones is avoided. In order to be independent of the charging device 7 and the charging cable it is however an advantage of the invention when the pyrotechnical disconnection unit 11 is accommodated individually inside the mobile device adjacent to the energy cell to be charged.

The housing 17 shown schematically in FIGS. 2 and 3 can be understood as outer housings of the mobile device. Other electronic devices with rechargeable batteries can profit from the system according to the invention and the pyrotechnical disconnection unit according to the invention.

It shall be clear that the lead 5 itself can form the disconnection unit according to the invention without the system being necessarily connected to the energy cell to be loaded or the charging device 7.

The lead 5, 13 according to the invention that is to be disconnected or to be destructed can for example be formed by a charging cable, wherein the pyrotechnical disconnection unit 11 can either be arranged in the course of the cable or arranged in the area of the housing sections for the plug battery-sidedly and/or charging device-sidedly. By the pyrotechnical disconnection unit 11 in the area of the lead 5 according to FIG. 1, a gentle disconnection in the critical operational state is ensured for both, for the charging device 7 and for the electronical energy cell 3. The lead 5, 13 according to the system does not necessarily have to be realized with two respective plugs, but can also be merely provided by one plug end, wherein the other plug end is already (inseparably) connected to the charging device 7 and/or the electrical energy cell. Furthermore, the charging connection according to the invention can be realized in that the electrical energy cell is charged electromagnetically, particularly contactless. The pyrotechnical disconnection unit 11 of such a charging coupling can either be arranged in the area, particularly inside the housing, of the electrical energy cell 3 or of the charging device 7. Such a charging coupling would refer to the system according to FIGS. 2 and 3.

FIGS. 4 and 5 show a pyrotechnical disconnection unit 11 according to the invention in detail, wherein FIG. 4 shows the pyrotechnical disconnection unit 11 prior to the ignition of the pyrotechnical effect, whereby FIG. 5 shows the pyrotechnical disconnection unit after its unfolding of the pyrotechnical effect.

The pyrotechnical disconnection unit 11 according to the invention comprises a housing or a closed container 31, which is formed particularly from a stiff material, such as plastic or metal. The container 31 can be understood as hermetically sealed housing having an inlet 33, 35 and an outlet 35, 33, through which a charging cable 37 is guided through fluid-tightly as an electrical lead in order to connect the electrical energy cell 3 with the charging device 7. In the embodiment shown in FIG. 4, the electrical energy cell, that means a rechargeable battery 3, is arranged, particularly glued, at its outer housing 15 at the upper side 41 of the container 31. The inlet/outlet 35, 33 can be formed as plug which can be inserted from outside and on which the internal connection section 37 can be connected.

The position of the arrangement of the container 31 at the outer side of the housing 15 of the rechargeable battery 3 can thereby be chosen in such a way that the heat sink being heated most can be chosen according to experience values during the charging. The heat dissipated by the battery 3 during the electrical charging is realized schematically through the six flashes 43.

The container has a base 47 that is in direct contact with the outer side 41 of the housing 15 of the battery 3. The heat 43 dissipated from the battery is directly conducted into the base 47 of the container 31. The base 47 is made of a heat conductive material, such as metal. At the inner side 51 of the base 47, a pyrotechnical means 53 is arranged, which is a thermal pre-ignition means according to the embodiment according to FIG. 4 (5). For the pyrotechnical means 53, compounds or compound mixtures are employed, which can unfold a pyrotechnical effect.

The components or component mixtures for the pyrotechnical means are adjusted in such a way that a predefined lighting temperature or deflagration temperature is set for example above about 80° C., 90° C., 100° C., 130° C., 150° C. or 180° C. Such a pyrotechnical means 53 is arranged in FIG. 4 as a package on the inner side 51 of the base 47 and is in contact with a cable 37, wherein the pyrotechnical means is surrounded by air and possibly further additives. For this purpose, a wide space inside the housing is to be provided, which is dimensioned at least in the same way as the volume for the inactivated pyrotechnical package. The pyrotechnical package occupies more than 50% of the entire area of the inner side 51 of the base 47. In this way, a conversion direction into the wide space is provided during the conversion of the pyrotechnical means 53, in which the connection cable 37 to be converted is positioned.

The inlet and the outlet 33, 35 is occupied by the passage cable 37, wherein a most dense possible finish is realized.

As shown in FIG. 4, the battery 3 produces heat 43, which is supplied to the pyrotechnical means 53, that means the pyrotechnical substances or substance mixtures, via the base 47. According to the embodiment according to FIGS. 4 (and 5), the pyrotechnical means is a so-called pre-ignition means, for example a nitrocellulose, a propellant powder or a mixture on the basis of nitro triazolone and guanidine nitrate. Such a pre-ignition means is for example listed in DE 197 30 873 A1, which patent application is incorporated here by reference. These mixtures exhibit an ignition temperature of about 150° C. to 170° C. The pre-ignition means should thereby be preferably long-term stable. As pre-ignition means, also azotetrazolate can be employed as component. Particularly, aminoguanidine-5,5'-azotetrazolate ($C_4H_{14}N_{18}$), in short AGATZ and guanidine-5,5'-azotetrazolate ($C_4H_{12}N_{16}$), in short GATZ are thereby employed as azotetrazolate component. In conjunction with that, it shall be referred to the European patent application with the publication number EP 1 890 986 B1, which goes back to the International patent application WO 2006/128910 and the German patent applications DE 10 2005 025 746 and DE 10 2006 013 622, which are included by reference to these documents in connection with the thermal pre-ignition means.

Furthermore, a thermal pre-ignition means 2-[bis-(2,4,6-trinitrophenyl)] amino ethyl nitrate, in short denoted as dipicryl amino ethyl nitrate (DPN), can be employed. This substance can either be used separately or in mixtures with other components. DPN can be produced from 2,4-dinitrochlorobenzole and ethanol amine with subsequent nitration (lit.: R. V. Clark, Ind. Eng. Chem., 25, 1385 (1933)). Regarding the thermal pre-ignition means, it referred to the published patent application WO 2005/058775 and the priority applications DE 103 59 536.8 and DE 10 2004 045 900.2, which shall be included here by reference.

After reaching the critical operational state, for example an operational temperature of 155° C., 160° C., 170° C., 180° C., 200° C., the pyrotechnical means 53 is converted because of the pre-ignition properties of the thermal pre-ignition means. The pyrotechnical effect effectuates the complete disintegration of the cable, as shown in FIG. 5, and combustion gas components remain, wherein an electrical coupling between the inlet-sided cable and the outlet-sided cable is excluded.

These combustion components are denoted in FIG. 5 in general with the reference numeral 57. The container 31 allows a pyrotechnically limited unfolding, which is set by the stiff housing/container 31. In this way, the environment of the pyrotechnical disconnection unit 11 is mostly protected from the pyrotechnical effect, particularly the battery 3 and the electrical connections to the technical disconnection unit.

Contrary to the embodiments according to FIGS. 4 and 5, the pyrotechnical disconnection unit 11 can also be formed independently from a thermal pre-ignition means, as described above. Moreover, classical pyrotechnical components and component mixtures can be employed without a predefined ignition temperature or at least a predefined pre-ignition temperature range.

The embodiment described hereinafter according to FIGS. 6 and 7 can relate to a pyrotechnical disconnection unit 11 that can be triggered and started precisely specifically at designated instances in time and temperature-independent operation situations.

In order to facilitate the reading of the figure descriptions, the same reference numerals are used for the embodiments according to FIGS. 6 and 7 for similar and identical components of the pyrotechnical disconnection unit according to the invention according to FIGS. 4 and 5.

The pyrotechnical disconnection unit 11 according to FIG. 6 differs from the pyrotechnical disconnection unit 11 according to FIG. 4 in that an additional activation means is provided apart from the inlet/outlet 33, 35 for feeding through the electrical connection cable 37. The activation means can also provide a control function, which is controlled by an external microprocessor. In general, the activation means has an ignition cable 61 that extends through an additional inlet and outlet 63, 65 particularly beneath the connection cable 37 across the inner space 55 of the container 31.

The ignition cable 61 is thereby arranged inside the container 31 in such a way that it is let through the package of the pyrotechnical means 53. About at the center of the pyrotechnical package 53, a heating element, for example an electrical resistance, is arranged, which can be heated because of an activation current that is supplied via the activation cable 61. In this embodiment, it is not necessary to employ one of the above-mentioned thermal pre-ignition means in order to allow a predefined unfolding of the pyrotechnical effect of the pyrotechnical means 53.

The heating of the heating element 67 takes place by energization, for example by a respective electrical signal, which can be generated distally to the pyrotechnical disconnection unit 11. In this way, the activation of the pyrotechnical disconnection unit 11 that is independent of the position of the battery 3 to be charged or the charging device 7 is facilitated.

It shall be clear that also other activation means can be arranged inside the pyrotechnical means in order to achieve an ignition of the pyrotechnical effect of the pyrotechnical means 53. As an example, a detonation cap or an ignition cap can be employed in order to initiate a further conversion of the pyrotechnical substance of the pyrotechnical means 53.

According to FIGS. 5 and 7, the connection cable 37 is completely converted during the unfolding of the pyrotechnical means, as well as the activation cable and the heating element (according to FIG. 6) which is completely disintegrated because of the high thermal energy during the ignition of the pyrotechnical effect. The container then contains combustion gas as well as residual components of the elements consumed by fire.

In this context, it can be necessary to seal the container hermetically as tightly as possible in order to avoid an uncontrolled release of combustion gases outside the container.

The features disclosed in the aforementioned description, the Figures and the claims can be of importance both separately and in arbitrary combinations for the realization of the invention in the different embodiments.

LIST OF REFERENCE NUMERALS 1 charging system
3 battery
5, 13 electrical connection/line
7 charging device
11 pyrotechnical disconnection unit
15 battery housing
17 mobile device housing
23 charging device housing
21 connection
31 container/housing of the pyrotechnical disconnection unit
33, 35 inlet/outlet
37 charging cable
41 upper side
43 heat
47 base
51 base inner side
53 pyrotechnical means
55 container inner space
57 combustion components
61 ignition cable
67 heating element

The invention claimed is:

1. A pyrotechnical disconnection unit for at least impairing an electrical charging coupling between a chargeable electrical energy cell and an electrical energy supply, comprising: an electrically conductive connection section via which electrical charging energy is supplied from the energy supply of the electrical energy cell, a housing in which the connection section is arranged, and a pyrotechnical substance accommodated in the housing in direct contact with an inner side of a base of the housing and arranged adjacent to a heat source, which is a characteristic for a critical operational state, the pyrotechnical substance being designed and/or being controllable in such a way that its pyrotechnical effect unfolds when reaching a predefined operational state, wherein the pyrotechnical substance is associated to the connection section in such a way that thermal energy from the pyrotechnical effect of the pyrotechnical substance directly effectuates complete disintegration of at least a portion of the connection section, thereby at least directly limiting the electrical conductivity of the connection section inside the housing.

2. The pyrotechnical disconnection unit according to claim 1, wherein the housing comprises at least one energy cell sided connection via which the connection section is connectable and/or connected to the energy cell and one charging device sided connection via which the connection section is connectable and/or connected to the energy supply.

3. The pyrotechnical disconnection unit according to claim 1, wherein the pyrotechnical substance comprises a thermal pre-ignition means, which converts when exceeding an operational temperature which is exposed to the pyrotechnical substance.

4. The pyrotechnical disconnection unit according to claim 1, wherein the housing has an overall volume, of which the pyrotechnical substance is not occupying more than 60% and a volume space free of the pyrotechnical substance is filled with gas.

5. A system for electrically charging an electrical energy cell, comprising: the pyrotechnical disconnection unit according to claim 1, an electrical energy cell and an electrical charging device, wherein the energy cell can be charged by the charging device via an electrical connection, wherein the pyrotechnical disconnection unit is integrated into the electrical connection, so that the electrical connection between the energy cell and the charging device is interrupted on ignition of the pyrotechnical disconnection unit.

6. A mobile device, comprising an electrical chargeable energy cell, a device housing in which the energy cell is accommodated completely and that has a connection, on which an electrical charging device is connectable, wherein inside the device housing of the mobile device, the pyrotechnical disconnection unit according to claim 1 is arranged in such a way that its pyrotechnical effect interrupts an electrical connection between the connection and the energy cell when reaching a predefined operational state.

7. A charging device for charging an electrical chargeable energy cell, comprising a device housing having a connection on which an energy cell is connectable, wherein the device housing of the charging device includes the pyrotechnical disconnection unit according to claim 1 in such a way that its pyrotechnical effect interrupts an electrical connection inside the device housing between the connection and the energy cell when reaching a predefined operational state.

8. A pyrotechnical disconnection unit for at least impairing an electrical coupling at an electrical energy supply, comprising: an electrically conductive connection section via which the electrical energy is conductible from the energy supply, a housing, in which the connection section is arranged, and a pyrotechnical substance accommodated in the housing in direct contact with an inner side of a base of the housing and arranged adjacent to a heat source, which is a characteristic for a critical operational state, the pyrotechnical substance being designed and/or controllable in such a way that its pyrotechnical effect is unfolded when reaching a predefined operational state, wherein the pyrotechnical substance is attributed to the connection section in such a way that thermal energy from the pyrotechnical effect of the pyrotechnical substance directly effectuates complete disintegration of at least a portion of the connection section, thereby at least directly limiting the electrical conductivity of the connection section inside the housing.

9. The pyrotechnical disconnection unit according to claim 8, wherein the housing comprises at least two connections via which the connection section is connectable and/or connected to an electrical component.

10. The pyrotechnical disconnection unit according to claim 8, wherein the pyrotechnical substance comprising a thermal pre-ignition means that converts when exceeding an operational temperature which the pyrotechnical substance is exposed to.

11. The pyrotechnical disconnection unit according to claim 8, wherein the housing has an overall volume of which the pyrotechnical substance is not occupying more than 60% and a volume space free of the pyrotechnical substance is filled with gas.

12. A system for electrically charging an electrical energy cell, comprising the pyrotechnical disconnection unit according to claim 8, a charging device, an electrical energy supply cell, and an electrical connection between the energy cell and the charging device, wherein the pyrotechnical disconnection unit is arranged in the electrical connection in such a way that the electrical connection between the energy cell and the charging device is interrupted on ignition of the pyrotechnical disconnection unit.

13. An electronic device, comprising an electrical chargeable energy cell, a device housing in which the energy cell is accommodated completely and that has a connection, on which an electrical charging device or an electrical load is connectable to, wherein the pyrotechnical disconnection unit according to claim 8 is arranged in the device housing in such a way that its pyrotechnical effect interrupts an electrical connection between the connection and the energy cell when reaching a predefined operational state.

14. A system for electrically discharging an electrical energy cell, comprising the pyrotechnical disconnection unit according to claim 8, an electrical energy cell and an electrical load, wherein the energy cell can be charged by the load via an electrical connection, wherein the pyrotechnical disconnection unit is integrated in the electrical connection so that the electrical connection between energy cell and load is at least impaired on ignition of the pyrotechnical disconnection unit.

15. The pyrotechnical disconnection unit according to claim 8, wherein the pyrotechnical substance comprises at least one of an azotetrazolate and dipicryl aminoethyl nitrate.

16. The pyrotechnical disconnection unit according to claim 15, wherein the pyrotechnical substance has a deflagration temperature below 200° C.

17. The pyrotechnical disconnection unit according to claim 15, wherein the pyrotechnical substance has a deflagration temperature in a range of 178° C. to 208° C.

18. The pyrotechnical disconnection unit according to claim 1, wherein the pyrotechnical substance comprises at least one of an azotetrazolate and dipicryl aminoethyl nitrate.

19. The pyrotechnical disconnection unit according to claim 18, wherein the pyrotechnical substance has a deflagration temperature below 200° C.

20. The pyrotechnical disconnection unit according to claim 18, wherein the pyrotechnical substance has a deflagration temperature in a range of 178° C. to 208° C.

21. The pyrotechnical disconnection unit according to claim 1, wherein the pyrotechnical substance is configured in the connection section so that thermal energy from the pyrotechnical effect of the pyrotechnical substance completely disintegrates at least a portion of the connection section.

22. The pyrotechnical disconnection unit according to claim 1, wherein the pyrotechnical substance comprises a thermal pre-ignition substance, and wherein the thermal pre-ignition substance converts when exceeding an operational temperature, whereby the pyrotechnical substance provides a monitoring function regarding the predefined operational state.

23. The pyrotechnical disconnection unit according to claim 8, wherein the pyrotechnical substance is configured in the connection section so that thermal energy from the pyrotechnical effect of the pyrotechnical substance completely disintegrates at least a portion of the connection section.

24. The pyrotechnical disconnection unit according to claim 8, wherein the pyrotechnical substance comprises a thermal pre-ignition substance, and wherein the thermal pre-ignition substance converts when exceeding an operational temperature, whereby the pyrotechnical substance provides a monitoring function regarding the predefined operational state.

* * * * *